COMPUTING APPARATUS

Filed Jan. 25, 1951 2 Sheets-Sheet 1

Inventors:
ROLF EDMUND SPENCER
RICHARD HERBERT BOOTH
BY Ralph E. Atherton
Attorney Inventors:
ROLF EDMUND SPENCER
RICHARD HERBERT BOOTH
By Ralph E. Atherton
Attorney

United States Patent Office 2,781,967

Patented Feb. 19, 1957

2,781,967

COMPUTING APPARATUS

Rolf Edmund Spencer, Ealing, London, and Richard Herbert Booth, Beaconsfield, England, assignors to Electric & Musical Industries Limited, Hayes, England, a company of Great Britain Application January 25, 1951, Serial No. 207,728

Claims priority, application Great Britain January 28, 1950

11 Claims. (Cl. 235—61)

This invention relates to computing apparatus.

In the United States Patent application Serial No. 110,404, filed August 15, 1949, by R. E. Spencer and G. H. Stephenson, now forfeited, there is described computing apparatus adapted to evaluate an arbitrary function by utilising Taylor's expansion for the function. The apparatus involves storing selected particular values of the function and one or more of its derivatives, by means of digital methods.

The object of the present invention is to provide improved computing apparatus with a view to simplifying the construction thereof.

According to the present invention there is provided computing apparatus adapted to evaluate a function by utilising Taylor's expansion for the function and wherein derivatives of the function employed in the expansion are automatically evaluated by the apparatus from values of the function, which may be either stored in the apparatus or evaluated thereby.

In one form of the present invention the derivatives may be automatically evaluated from the stored selected values of the function, and this form of the invention is applicable to evaluating functions such as exponential functions and transcendental functions where the derivatives are simply related to the function itself, being for example equal to the function multiplied by a numerical constant.

In another and preferred form of the present invention derivatives employed in the expansion are derived by feedback from the output of the computing apparatus. This form of the invention makes use of the fact that, as will hereinafter appear, it is possible to modify Taylor's expansion and express it in the form $f(x)=f(x-\delta x)$ $$+\sum_{n=1}^{\infty}(-1)^{n+1}\frac{f^n(x)}{n!}\delta x^n$$

It will be observed that in this form of Taylor's expansion the terms which involve derivatives are expressed in terms of the value of $f(x)$ evaluated by the apparatus so that it is possible to use feedback from the output thereof.

According to one application of this latter form of the present invention there is provided apparatus for evaluating the instantaneous value of cos $x$ and sin $x$.

According to another application of this latter form of the present invention there is provided apparatus for converting Cartesian co-ordinates $x$ and $y$ into polar co-ordinates R and S, comprising means for setting up a quantity $x\cos\theta+y\sin\theta$ and a quantity $x\sin\theta-y\cos\theta$, and means for varying $\theta$ to make the second-mentioned quantity substantially zero thereby rendering $\theta$ equal to S and the first-mentioned quantity equal to R.

Figure 1:
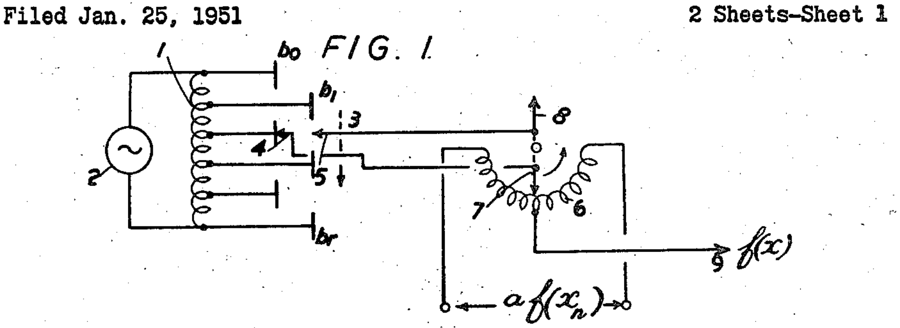
Figure 2:
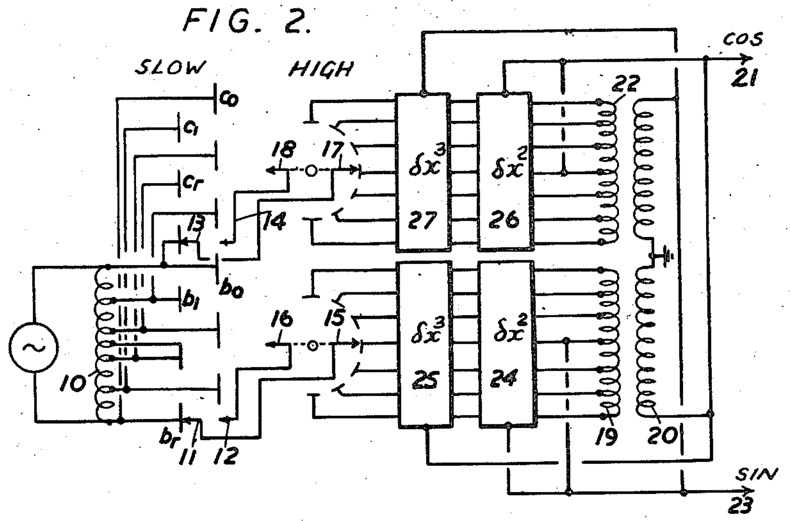
Figure 3:
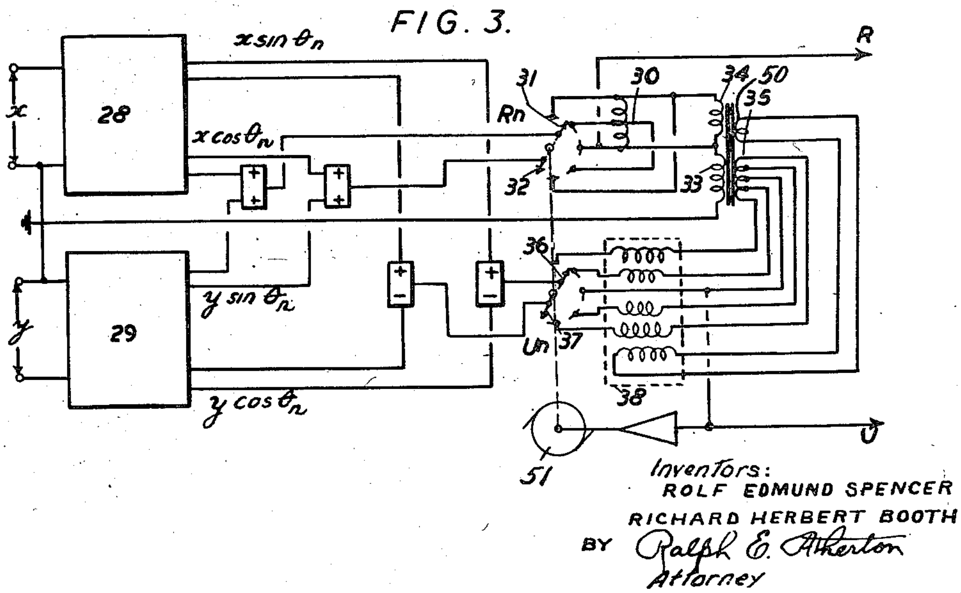
Figure 4:
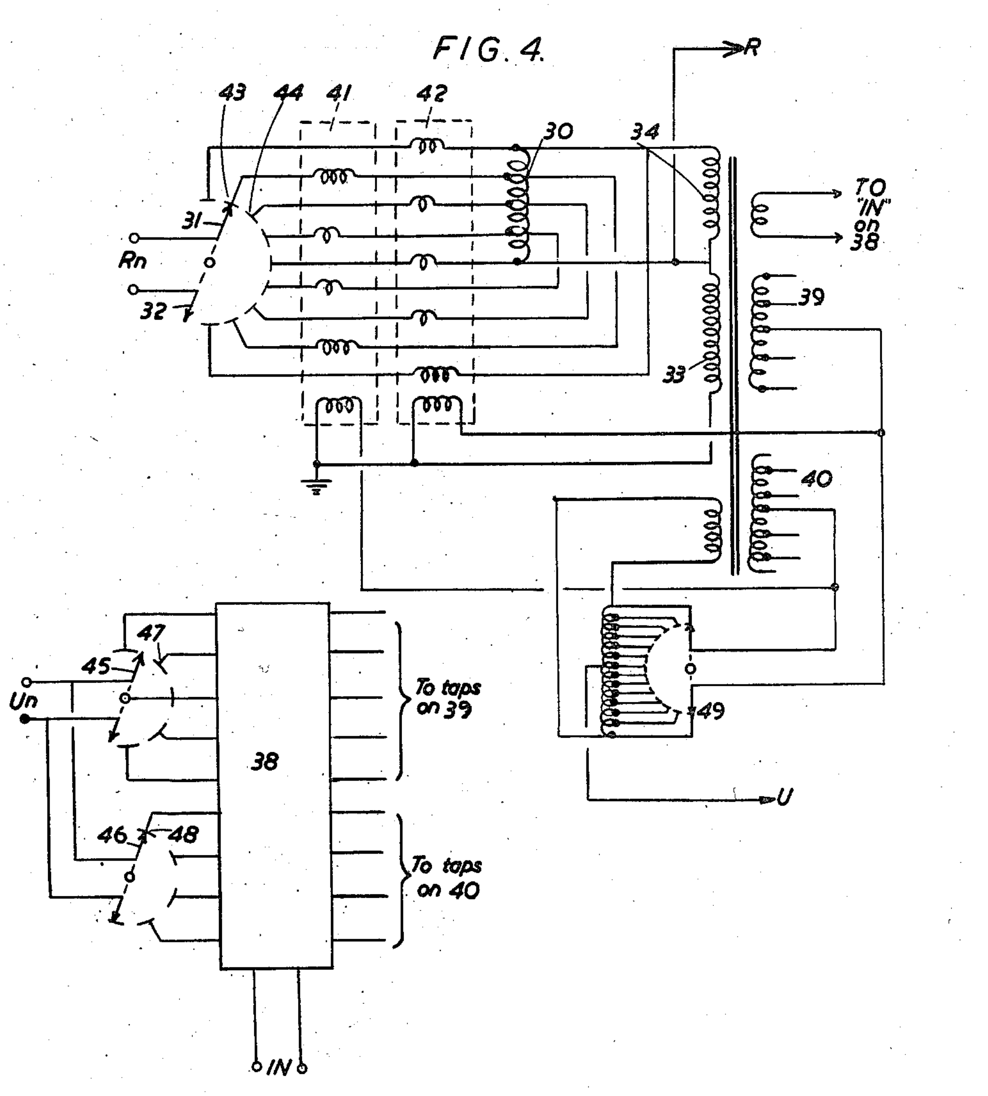

In order that the present invention may be clearly understood and readily carried into effect the same will now be more fully described with reference to the accompanying drawings in which:

Figure 1 illustrates diagrammatically one application of the present invention to the evaluation of the exponential function, Figure 2 illustrates diagrammatically an application of the present invention to the evaluation of transcendental functions, Figure 3 illustrates diagrammatically an application of the present invention to the de-resolution of Cartesian co-ordinates into polar co-ordinates, and Figure 4 illustrates a modification of the apparatus illustrated in Figure 3.

Referring to the drawings, the simple apparatus illustrated in Figure 1 illustrates in principle the application of the present invention in the first-mentioned form to the synthesis of exponential and trigonometrical functions. In the case of the exponential function $$f(x)=e^{ax},\ f'(x)=af(x),\ f^{(n)}(x)=a^nf(x)$$

Therefore $$f(x+\delta x)=f(x)+af(x)\delta x+a^2\frac{f(x)\delta x^2}{2!}+\ \cdot\ \cdot\ \cdot$$

In Figure 1 voltages representative of successive particular values of $f(x)$ are set up at the studs $b_0b_1 \ldots b_r$ of a low speed switch. The studs are connected to taps on a potentiometer 1 fed from a reference voltage source 2. The tapped potentiometer 1 can thus be regarded as means for storing values of the function for successive particular values of the variable. The selector member 3 of the low speed switch has two contact brushes 4 and 5 and is suitably controlled so that its displacement represents the instantaneous value of $x$. An interpolating potentiometer 6 is fed with a voltage equal to the voltage set up at that one of the studs $b_0 \ldots b_r$ with which the member 3 is at the time in engagement, multiplied by the constant $a$. A suitable high speed switch not shown is provided to connect the potentiometer 6 alternately to the brushes 4 and 5 in dependence upon the order in which the brushes engage the contacts $b_0 \ldots b_r$. The potentiometer 6 has two high speed brushes 7 and 8 connected respectively to the brushes 4 and 5 and driven synchronously therewith so that each scans the potentiometer 6 while the corresponding brush 4 or 5 moves through the range of positions in which it remains in engagement with the respective stud of the series $b_0 \ldots b_r$. The displacement of the brush 7 or the brush 8 represents the instantaneous value of $\delta x$. The output is obtained at 9 and represents $f(x_n)+af(x_n)\delta x$. This is approximately equal to $f(x_n+\delta x)$ so that the apparatus illustrated can be applied to evaluate approximately $f(x)$ for any value of $x$ between $x_0$ and $x_r$. The principle illustrated could of course be applied also to the interpolation of the quadratic and higher order terms in Taylor's expansion for $f(x)$ where more accurate evaluation of $f(x)$ is required or where larger intervals between the studs $b_0b_1 \ldots b_r$ are used.

In the case of sine and cosine functions, $$f(x)=\binom{\sin}{\cos}ax,\ f'(x)=\binom{a\cos}{-a\sin}ax,\ f''(x)=-a^2f(x)$$

each function (apart from constant terms) being the positive of alternate derivatives of the other function. The derivatives can be obtained over a range of 90° by providing an extension of the studs $b_0b_1 \ldots b_r$ to cover a further right angle, the studs being interconnected so that a stud in position $\phi$ will be joined to that in position $(180°-\phi)$. If the first set of studs is then connected to voltages representing $\sin\phi_n$ a pair of brushes 90° apart will pick up voltages corresponding to $\sin\phi_n$ and $\cos\phi_n$ over the interval of 0–90°, which are the alternate interpolation coefficients required for utilising Taylor's expansion to evaluate $f(x)$. Since in many cases both sine and cosine functions will be required the second brush would be already provided apart from the need for both functions for interpolation purposes. In the following description no further reference is made to a constant term such as $a$ since it will be appreciated that provision can readily be made for it, as a constant of proportionality, in the initial construction of the machine.

It is a disadvantage of the method above that high speed switching is required to change between two slow speed brushes (e. g. 4 and 5) for feeding interpolation potentiometers (e. g. 6). This can be overcome by using the final output from the unit, $f(x)$, instead of the stored particular values of $f(x)$, say $f(x_n)$, as the interpolation coefficient. Instead of the usual Taylor's series $$f(x) \equiv f(x_n+\delta x) = f(x_n) + f'(x_n)\delta x + \dots \frac{f^{(m)}(x_n)}{m!}\delta x^m + \dots \quad (1)$$

the series can be written as $$f(x_n) \equiv f(x-\delta x) = f(x) - f'(x)\delta x + \frac{f''(x)}{2!}\delta x^2 \dots + (-1)^m f^{(m)}(x)\delta x^m + \dots \quad (2)$$

This form of the series follows directly from (1) by writing $x_n$ for $x$ and $-\delta x$ for $\delta x$. From series (2) there is obtained $$f(x) = f(x_n) + f'(x)\delta x - f''(x)\frac{\delta x^2}{2!} + \dots + \frac{(-1)^{m+1}f^{(m)}(x)}{m!}\delta x^m + \dots \quad (3)$$

which will be called the "modified Taylor's series," expressing $f(x)$ in terms of $f(x_n)$ and $f^{(m)}(x)$. In this series the terms after the first on the right hand side each involve $\delta x$, which is an independent increment, and a derivative of the final output $f(x)$ which as aforesaid thus becomes the interpolation coefficient, that is it forms the coefficients of the terms $\delta x$ which are used to yield interpolation.

The sine series becomes $$\sin x = \sin x_n + (\cos x)\delta x + \frac{\sin x}{2!}\delta x^2 - \frac{\cos x}{3!}\delta x^3 + \dots$$

and it is instructive to re-write this as $$\sin x = \sin x_n + \cos x\left\{\delta x - \frac{\delta x^3}{3!} + \frac{\delta x^5}{5!}\dots\right\} + \sin x\left\{\frac{\delta x^2}{2!} - \frac{\delta x^4}{4!}\dots\right\}$$

$$\sin x_n + \cos x\sum_{n=1}^{n=k}(-1)^{n+1}\frac{\delta x^{2n-1}}{2n-1!} + \sin x\sum_{n=1}^{n=k}(-1)^{n+1}\frac{\delta x^{2n}}{2n!} \quad (4)$$

In the same way it can be shown that $$\cos x = \cos x_n + \sin x\sum_{n=1}^{n=k}(-1)^n\frac{\delta x^{2n-1}}{(2n-1)!} + \cos x\sum_{n=1}^{n=k}(-1)^{n+1}\frac{\delta x^{2n}}{2n!} \quad (4a)$$

The forms (4) and (4*a*) are those in which instrumentation is most easily carried out, since $\delta x$, $\delta x^2$, $\delta x^3$, to as many terms as necessary, can be obtained by tapping transformers linearly, quadratically, cubically and so on and feeding them from one or other of two output channels as required. It will be seen that it is comparatively simple to perform higher order interpolation, since the interpolation coefficients are available being merely $\sin x$ and $\cos x$, and advantage may be taken of this to use larger intervals than would otherwise be possible between the stored particular values of $f(x)$.

A diagram of a simple sine-cosine computing apparatus using cubic interpolation is shown in Figure 2. Voltages are set up at the studs $b_0 b_1 \dots b_r$ representative of successive particular values of say $\sin x$ while voltages representative of the corresponding particular values of cosine $x$ appear at the studs $c_0, c_1 \dots c_r$, which are connected to $b_0$, $b_1$, $b_2 \dots$ as described above. The displacement of the low speed brushes 11 . . . 14 represents the instantaneous value of $x_n$ and that of the high speed brushes 15 . . . 18 represents the instantaneous value of $\delta x$. The high speed brushes 15, 16 co-operate with the studs connected to taps on a linearly tapped potentiometer 19 to which is fed back inductively from the winding 20, a voltage representative of $\cos x$. The last said voltage is fed back from the cosine output terminal of the apparatus, indicated at 21, to form an interpolation coefficient signal. The high speed brushes 17 and 18 similarly co-operate with studs connected to taps on a potentiometer 22 to which a voltage representative of $\sin x$ is fed back from the sine output terminal 23 of the apparatus to form another interpolation coefficient signal. The output at the terminal 21 is obtained from the centre tap of the potentiometer 22 whilst the output at the terminal 23 is obtained from the centre tap of the potentiometer 19. The studs of the high speed brushes 15, 16 and 17, 18 correspond to successive values of $\delta x$, the displacement of the brushes being representative of the instantaneous value of $\delta x$, the taps on the potentiometers 19 and 22 being such that the voltage on each tap, with reference to the centre tap, is representative of $\delta x \cos x$ or $\delta x \sin x$ as the case may be where $\delta x$ has the value corresponding to the respective contact stud. Each lead to the taps on the potentiometer 19 and 22 receives further voltage from transformer devices 24 . . . 27 indicated in block form. The devices 24 and 27 are respectively arranged to inject into the leads voltages representative of $\sin x$ (derived by feedback from 23) multiplied by the values of $\delta x^2$ and $\delta x^3$ appropriate to the particular leads. Similarly the devices 25 and 26 inject respectively voltages representative of $\delta x^3 \cos x$ and $\delta x^2 \cos x$. Thus, for example, the device 24 comprises a primary winding across which the voltage fed back to the terminal 23 is applied, and a series of secondary windings connected in series in the leads to the taps on the potentiometer 19, the number of turns in each secondary winding being representative of the value of $\delta x^2$ where $\delta x$ has the value corresponding to the stud at which the lead terminates. The devices 25, 26 and 27 may be similarly constructed. In this way the output fed to 23 is built up according to Equation 4 and similarly the output fed to 21 is built up according to the Equation 4*a*, $\sin x$ and $\cos x$ again being the interpolation coefficient signals.

An interesting and very practical application of the present invention is that of de-resolution of Cartesian co-ordinates into polar co-ordinates, in which, because of the way in which sine and cosine are handled in combination, considerable simplification can be achieved.

Use is made of the basic equations $$R = x\cos S + y\sin S \quad (5)$$

$$O = x\sin S - y\cos S \quad (6)$$

where R and the angle S are respectively the polar co-ordinates and $x$ and $y$ are the Cartesian co-ordinates. The voltage representing the right-hand side of (6) is used to drive a servomotor, the angular displacement of whose shaft is used to set up the angle S. Two electrical inputs, $x$ and $y$, are thus transformed to one mechanical output, S, and one electrical output, R.

In order to illustrate the potentialities of the system, the case of cubic interpolation will be considered.

Let $S = \theta_n + \delta\theta$ where $\theta_n$ is the value of S at a reference point, and $\delta\theta$ the equivalent angle of the high speed shaft. Also let $$R_n = x\cos\theta_n + y\sin\theta_n$$

$$U_n = x \sin \theta_n - y \cos \theta_n$$
$$U = x \sin (\theta_n + \delta\theta) - y \cos (\theta_n + \delta\theta)$$

Then $$\frac{\delta^{2n} R}{\delta S^{2n}} = (-1)^n R$$
$$\frac{\delta^{2n+1} R}{\delta S^{2n+1}} = (-1)^{n+1} U$$
$$\frac{\delta^{2n} U}{\delta S^{2n}} = (-1)^n U$$
$$\frac{\delta^{2n+1} U}{\delta S^{2n+1}} = (-1)^n R$$

It will be appreciated that each of the functions R and U are so related that each function, apart from constant terms, is the positive of alternate derivatives of the other functions.

Using the modified Taylor's series (3)

$$R = R_n - U\delta\theta + \frac{R\delta\theta^2}{2} + \frac{U\delta\theta^3}{6} - \cdots$$
$$U = U_n + R\delta\theta + \frac{U\delta\theta^2}{2} - \frac{R\delta\theta^3}{6} + \cdots$$

but at balance U is zero so that $$R = R_n + \frac{R\delta\theta^2}{2}$$
$$U = U_n + R\left(\delta\theta - \frac{\delta\theta^3}{6}\right)$$

where $\delta\theta^4$ and higher powers have been neglected.

It may be noted in passing that these last equations are equivalent to $$R_n = R \cos \delta\theta$$
$$U_n = -R \sin \delta\theta$$

and they can easily be derived geometrically in this form.

A schematic diagram of an apparatus operating on the above principle is shown in Figure 3, and it will be observed that a considerable saving in complexity has in fact been achieved compared with the two units similar to Figure 2 which would otherwise be needed. The devices indicated in block form at 28 and 29 are arranged to set up $x \sin \theta_n$, $x \cos \theta_n$ $y \sin \theta_n$, and $y \cos \theta_n$ as indicated, the devices each being similar to the slow speed part of Figure 2, except that instead of being energised with a fixed reference voltage, they are energised by voltages representative of $x$ and $y$ respectively. An output representative of R is taken from an output terminal denoted by the reference R and feedback from the output is applied to a transformer winding 30 via transformer windings 33 and 34 so that the feedback voltage applied to the winding 30 is representative of the appropriate submultiple R, which in this case is $R/2$, the lower end (in the drawing) of winding 30 being connected as shown to the output terminal. The winding 30 is tapped quadratically and the taps are connected to contact studs of a high speed switch which has brushes 31 and 32 driven by the high speed shaft of the apparatus, the angular displacement of the brushes representing $\delta\theta$ and the taps on the winding 30 being such that the voltage set up between each tap and the lower end of the winding is representative of $R\delta\theta^2/2$, where $\delta\theta$ has the value corresponding to the respective stud. The brushes 31 and 32 are as shown fed with a voltage respresentative of $x \cos \theta_n + y \sin \theta_n$, that is $R_n$, from the units 28 and 29, and this voltage is fed via one or other of the studs of the high speed switch to the corresponding tap on the winding 30 and thence to the output terminal R, so that the output voltage R is equal to $R_n + R\delta\theta^2/2$ as required. The winding 35, forming part of the interpolating potentiometer of the U section of the apparatus, is fed with a voltage representative of R since it is inductively coupled to the primary winding 33 and it is linearly tapped, the taps being connected as indicated to the contact studs of a high speed switch which has brushes 36 and 37 driven by the high speed shaft of the apparatus. The angular displacement of the brushes 36 and 37 is thus representative of $\delta\theta$, an output representative of U is taken from the mid-point of the winding 35 and the voltage set up at each tap on this potentiometer is representative of $R\delta\theta$, where $\delta\theta$ has the value corresponding to the respective stud to which the tap is connected. The transformer unit enclosed in the dotted rectangle 38 injects $R\delta\theta^3/6$ into each lead from the potentiometer 35, the value of $\delta\theta$ for each lead being appropriate to the displacement of the corresponding stud in the path of the brushes 36 and 37. Thus the transformer unit 38 has a primary winding energized from the winding 50 on the R section transformer with a signal representative of $R/6$ whilst the secondary winding is connected in series in each lead, each secondary winding having a polarity and number of turns representative of $-\delta\theta^3$ where $\delta\theta$ has the value corresponding to the respective stud. The brushes 36 and 37 are fed with voltages representative of $x \sin \theta_n - y \cos \theta_n$, that is $U_n$, from the units 28 and 29 and this is fed via one of the studs, and thence via a secondary winding of the transformer unit 38 and via a section of the winding 35 to the output point so that the output voltage U is equal to $U_n + R\delta\theta - R\delta\theta^3/6$ as required. A servomotor 51 responsive to the output U drives the shafts of the high speed brushes in the units 28 and 29 until U is zero. S is then represented by the position of the high speed shaft taken in conjunction with the position $n$ of the low speed shaft in the units 28 and 29.

If the steps of the brushes 36 and 37 are too large to enable U to be reduced identically to zero in all cases, the first order term $-U\delta\theta$ in the expansion of R is not zero, but an appropriate voltage can be injected into the leads from the potentiometer 30 to the $R_n$ switch 31, 32 by means of a further linear transformer unit fed voltage representing U.

Figure 4 illustrates a modification of Figure 3, in which such injection is made, corresponding parts in Figures 3 and 4 being denoted by the same reference numerals, and some parts being omitted in Figure 4 in the interests of simplicity. Two injection transformer units 41 and 42 are used each having secondaries in series with alternate leads from the tapped auto-transformer 30 and having primaries fed with signals representing U as will hereinafter appear. The U section high speed switch with brushes 36 and 37 of Figure 3 is replaced by two switches with brushes 45 and 46 and with their studs arranged to be electrically alternate, that is the studs under brush 45 correspond to alternate values of $\delta\theta$ while those under brush 46 correspond to the intervening values as indicated. These studs are fed from two secondary windings 39 and 40 which replace the winding 35 of the R transformer in Figure 3. The primary windings of the transformer units 41 and 42 receive their inputs (representative of U) from the centre taps of the windings 39 and 40 respectively. The arrangement of the switches is such that when a brush on the $R_n$ switch (say the brush 31) is about to leave stud 43 for example, the voltage being injected into the lead from the winding 30 comes from the transformer 40 and stud 48 with which brush 46 is in contact. But already brush 45 will have made contact with stud 47 (assuming the switches rotate in the clockwise direction) and stud 44 will have an injected voltage fed to it appropriate to its own value of $\delta\theta$. This ensures that studs 43 and 44 and similarly other successive studs of the $R_n$ switch have substantially identical voltages when the brush changes over from one to the next and will secure a smooth gradation of output voltages. A high speed switch 49 must now be employed to select the final U output from the two values obtainable at the centre taps of transformer secondaries 39 and 40. As shown this additional switch 49 is providing additional interpolation but it could be employed merely as a change over switch.

The saving in complexity in the arrangements illustrated in Figures 3 and 4 has been achieved by the combination of sine and cosine at the reference point stage, and in the employment of R and U in Taylor's series instead of their constituent parts. A still further simplification results from the very small or zero value of some of the differential coefficients.

What we claim is:

1. Apparatus for evaluating the instantaneous value of an exponential function $e^{ax}$, where $a$ is a constant and $x$ is an independent variable, comprising means for storing values of the function for successive particular values of the independent variable $x$, switch means operable in dependence upon $x$ for selecting the stored value of the function for the particular value of $x$ nearest the instantaneous value thereof, further switch means operable in dependence on $x$ to represent $\delta x$ the difference between the instantaneous value of $x$ and said nearest particular value, means for forming an incremental signal proportional to the product of $\delta x$ and the selected value of the function, said means being predetermined to cause the constant of proportionality of the incremental signal to represent $a$ and means for adding the selected value of the function and said incremental signal so as to evaluate approximately the function for the instantaneous value of $x$.

2. Apparatus for evaluating the instantaneous value of cos $ax$ where $a$ is a constant and $x$ is an independent variable, comprising means for storing values of the functions cos $ax$ and sin $ax$ for successive particular values of the independent variable $x$, switch means operable in dependence on $x$ for simultaneously selecting the stored value of cos $ax$ and sin $ax$ for the particular value of $x$ nearest the instantaneous value thereof, further switch means operable in dependence on $x$ for forming the product of $a\delta x$ and the selected value, to represent the difference $\delta x$ between the instantaneous value of $x$ and said nearest particular value thereof, means for forming an incremental signal proportional to the product of $\delta x$ and the selected value of sin $ax$, said last means being predetermined to cause the constant of proportionality of the incremental signal to represent $a$ and means for subtracting said incremental signal from the selected value of cos $ax$ to evaluate approximately cos $ax$ for the instantaneous value of $x$.

3. Apparatus for evaluating the instantaneous value of a function $f(x)$, comprising means for storing values of $f(x)$ for successive particular values of the independent variable $x$, switch means operable in dependence on $x$ for selecting the stored value of $f(x)$ for the particular value of $x$ nearest the instantaneous value thereof, means for setting up at least the first derivative of an output from said apparatus, means operable in dependence upon $x$ to represent $\delta x$ the difference between said instantaneous value of $x$ and said nearest particular value, means for forming an incremental signal proportional to the product of $\delta x$ and said first derivative, means for adding said incremental signal to the selected value of $f(x)$ to form said output, whereby said output is representative of $$f(x-\delta x)+f'(x)\delta x$$

which is approximately the value of $f(x)$ for the instantaneous value of $x$.

4. Apparatus for converting Cartesian co-ordinates $x$ and $y$ into polar co-ordinates R and S, comprising means for setting up the values of $x$ cos $\theta$, $y$ sin $\theta$, $x$ sin $\theta$ and $y$ cos $\theta$ for successive particular values of $\theta$, switch means operable in dependence on $\theta$ to select the values of $x$ cos $\theta$, $y$ sin $\theta$, $x$ sin $\theta$ and $y$ cos $\theta$ for the particular values of $\theta$ nearest the instantaneous value thereof, means for adding the first and second-mentioned selected values to form a quantity $R_n$ and for subtracting the fourth from the third-mentioned selected values to form a quantity $U_n$, means operable in dependence on $\theta$ to represent $\delta\theta^2/2$ where $\delta\theta$ is the difference between said particular value of $\theta$ and the instantaneous value thereof, means for forming an incremental signal representing the product of $\delta\theta^2/2$ and a first output from the apparatus, means for adding said incremental signal to the quantity $R_n$ to form said first output, further means operable in dependence on $\theta$ to represent $\delta\theta$ and $\delta\theta^3/6$, means for forming the product of $\delta\theta$ and said first output, means for forming the product of $\delta\theta^3/6$ and said first output, means for subtracting said last-mentioned product from said second last-mentioned product to form a second incremental signal, and means for adding said second incremental signal to $U_n$ to form a second output from said apparatus, whereby said second output is approximately representative of the instantaneous value of $x$ sin $\theta$—$y$ cos $\theta$ whilst said first output is approximately representative of the instantaneous value of $x$ cos $\theta+y$ sin $\theta$, and has the value of R whilst $\theta$ has the value S when $\theta$ has such a value that said second-mentioned output is zero.

5. Apparatus according to claim 4, comprising means for forming the product of the second-mentioned output and $\delta\theta$, and means for subtracting the last-mentioned product from the sum of $R_n$ and the first-mentioned product to form said first output thereby to increase the accuracy of the evaluation of R.

6. Apparatus for computing instantaneous values of a function of a variable, comprising value storage means for setting up signals representative of values of the function for particular values of the variable, selector means for selecting the signal representing the function for the particular value of the variable nearest the instantaneous value thereof, means for setting up a difference signal representing the difference between said nearest and instantaneous values of the variable, means for deriving an interpolation coefficient signal responsive to said selected signal, means for forming the product of said difference signal and said interpolation coefficient signal, and means for adding said product to said selected signal to form an output representative approximately of the instantaneous value of said variable.

7. Apparatus for computing instantaneous values of a function of a variable, comprising value storage means for setting up signals representing values of said function for successive particular values of said variable, selector means for selecting from said storage means a signal representing the function for the nearest particular value of said variable, means for setting up a difference signal representing the difference between said nearest and instantaneous values of the variable, an output circuit, means for deriving a signal representing a derivative with respect to said variable of the output from said output circuit, means for forming an incremental signal comprising the product of said derivative and a power of said difference signal, means for adding said incremental signal to said selected signal and for feeding the sum so formed to the output circuit, whereby the output from said output circuit approximately represents the instantaneous value of said function.

8. Apparatus for evaluating the instantaneous value of sin $ax$ where $a$ is a constant and $x$ is an independent variable, comprising means for storing values of the functions cos $ax$ and sin $ax$ for successive particular values of the independent variable, switch means operable in dependence on $x$ for simultaneously selecting the stored value of cos $ax$ and sin $ax$ for the particular value of $x$ nearest the instantaneous value thereof, further switch means operable in dependence on $x$ to represent the difference $\delta x$ between the instantaneous value of $x$ and said nearest particular value thereof, means for forming an incremental signal proportional to the product $\delta x$ and a selected value of cos ax, said last means being predetermined to cause the constant of proportionality of the incremental signal to represent $a$ and means for adding said incremental signal to the selected value of sin $ax$ to evaluate approximately sin $ax$ for the instantaneous value of $ax$.

9. Apparatus for converting Cartesian co-ordinates $x$ and $y$ into polar co-ordinates R and S, comprising value storage means responsive to input signals representing instantaneous values of $x$ and $y$ for setting up signals representing respectively the functions $x$ cos $\theta$, $y$ sin $\theta$, $x$ sin $\theta$ and $y$ cos $\theta$ for successive particular values of $\theta$, selector means for selecting the value of each of said functions for a particular value of $\theta$, means for utilizing said selected values to form the quantity $x \cos \theta + y \sin \theta$ and the quantity $x \sin \theta - y \cos \theta$, means for forming a difference signal representing the difference between said particular value of $\theta$ and the value of $\theta$ which makes said second sum zero, first and second output circuits, means for forming incremental signals each comprising a product of the output from one of said output circuits and a power of said difference signal, means for adding incremental signals respectively to said first and second quantities and for feeding the total including said first quantity to said first output circuit and for feeding the total including said second quantity to said second output circuit to make the output of said second output circuit zero and that of said first circuit approximately representative of R, whereby $\theta$ with the addition of said difference signal approximately equals S.

10. Apparatus for evaluating cos $x$ and sin $x$ where $x$ is a variable angle, comprising means for storing values of cos $x$ and sin $x$ for successive particular values of $x$, switch means operable in dependence upon $x$ for selecting from said first means values of cos $x$ and sin $x$ for the particular value of $x$ nearest the instantaneous value thereof, further switch means operable in dependence on $x$ to represent $\delta x$, the difference between the instantaneous value of $x$ and said nearest particular value, means for forming a first incremental signal proportional to the product of a first output from said apparatus and $\delta x$, means for forming a second incremental signal proportional to the product of a second output from the apparatus and $\delta x$, means for subtracting said first incremental signal from the selected value of cos $x$ to form said second output whereby said second output approximately represents the value of cos $x$ for the instantaneous value of $x$, and means for adding said second incremental signal to the selected value of sin $x$ to form said first output whereby said first output approximately represents the value of sin $x$ for the instantaneous value of $x$.

11. Apparatus for computing values of two functions which are so related that each function, apart from constant terms, is the positive of alternate derivatives of the other function, comprising value storage means for setting up signals representing values of the two related functions for particular values of the variable of the functions, selector means for selecting from said storage means a first signal representing one function for the particular value of the variable nearest the instantaneous value thereof, selector means for selecting from said storage means a second signal representing the other function for the particular value of the variable nearest the instantaneous value thereof, means responsive to a first output of said apparatus for deriving a first incremental signal, means responsive to a second output of said apparatus for deriving a second incremental signal, means for adding said first signal and said second incremental signal to evaluate approximately the first function for the instantaneous value of the variable and thereby form said first output, and means for adding said second signal and said first incremental signal to evaluate approximately the second function for the instantaneous value of the variable and thereby form said second output.

References Cited in the file of this patent

UNITED STATES PATENTS

| | | |
|---|---|---|
| 2,404,387 | Lowell et al. | July 23, 1946 |
| 2,507,890 | Crowtner | Nov. 19, 1947 |
| 2,436,178 | Rajchman | Feb. 17, 1948 |
| 2,634,909 | Lehmann | Apr. 14, 1953 |

FOREIGN PATENTS

| | | |
|---|---|---|
| 600,896 | Great Britain | Apr. 21, 1948 |